(12) United States Patent
Lee

(10) Patent No.: US 8,438,749 B2
(45) Date of Patent: May 14, 2013

(54) DRIVE MECHANISM FOR ARTICLE DEHYDRATION

(75) Inventor: Pei Yuan Lee, Changhua Hsien (TW)

(73) Assignee: Rock Tone Enterprise Co. Ltd., Changhua County (TW)

( * ) Notice: Subject to any disclaimer, the term of this patent is extended or adjusted under 35 U.S.C. 154(b) by 1020 days.

(21) Appl. No.: 12/475,469

(22) Filed: May 29, 2009

(65) Prior Publication Data

US 2010/0077878 A1    Apr. 1, 2010

(30) Foreign Application Priority Data

Oct. 1, 2008  (TW) ............................... 97217588 U

(51) Int. Cl.
 *F26B 11/08* (2006.01)
(52) U.S. Cl.
 USPC ................ 34/58; 15/260; 74/89.45
(58) Field of Classification Search ............... 34/58, 59, 34/312, 318, 322, 397; 74/89.23, 89.45, 25, 74/512; 15/260
 See application file for complete search history.

(56) References Cited

U.S. PATENT DOCUMENTS

| | | | |
|---|---|---|---|
| 1,716,586 A * | 6/1929 | Julian | 12/86.65 |
| 7,743,528 B2 * | 6/2010 | Lin | 34/58 |
| 8,028,369 B2 * | 10/2011 | Chiang | 15/260 |
| 8,065,777 B2 * | 11/2011 | Lin | 15/260 |
| 8,239,997 B2 * | 8/2012 | Lin | 15/260 |
| 2007/0240329 A1 * | 10/2007 | Weiss | 34/312 |
| 2010/0077561 A1 * | 4/2010 | Yu | 15/260 |

FOREIGN PATENT DOCUMENTS

TW    M338634    8/2008

* cited by examiner

*Primary Examiner* — David M Fenstermacher
*Assistant Examiner* — Terence Boes
(74) *Attorney, Agent, or Firm* — Chi IP Law Firm

(57) ABSTRACT

A drive mechanism for dehydrating a mop. The drive mechanism includes a base (10); a driven gear (12) rotatably mounted on the base; a propeller shaft (121) having a lower end rotated by the driven gear and an upper end to rotate a rotation barrel (21); a driving gear (11) meshing with the driven gear; a spinning shaft (111) to rotate the driving gear; a drive member (13) having a spinning shaft hole (131) meshing with the spinning shaft; an elastic member (14) biased between the drive member and a housing (20) to move the drive member downward relative to the spinning shaft; and a pedal (15) pivotally mounted on the base to move the drive member upward relative to the spinning shaft. The driving gear has a diameter greater than that of the driven gear to drive the driven gear to rotate the rotation barrel easily and quickly.

9 Claims, 6 Drawing Sheets

DRIVE MECHANISM FOR ARTICLE DEHYDRATION

BACKGROUND OF THE INVENTION

1. Field of the Invention

Aspects of the invention generally relate to a drive mechanism for dehydrating an article which may have absorbed excess liquids or particles.

2. Background

A conventional dehydrating device disclosed in the Taiwanese Patent application, serial no. 096221538 uses a spinning action to dry a mop. The above-mentioned conventional dehydrating device comprises a drive unit 3 including a rack 31 mounted in a groove 123 of an arrangement 12. The rack 31 has a protruding post 311. The movement of rack 31 is limited by a guide roller 121 and a guide track 122. The rack 31 co-operates with a push unit 4 to drive a first gear 32, a second gear 33 and a third gear 34. However, such construction of the drive unit 3 is complicated; thereby it increases the costs of manufacture of the drive unit 3.

BRIEF SUMMARY OF THE INVENTION

In one embodiment of the present invention, an improved drive mechanism for dehydrating a mop includes a first gear or a driving gear that has a diameter greater than that of a second gear or a driven gear so that the driving gear can drive the driven gear quickly to rotate a rotation barrel of the dehydrating device so as to dry a head of the mop easily and quickly.

According to one aspect of the invention, a drive mechanism for a dehydrating device for drying a mop includes a base, and a driven gear rotatably mounted on the base. The drive mechanism also includes a propeller shaft having a lower end secured on and rotated by the driven gear and an upper end extending through a housing of the dehydrating device. The propeller shaft is secured to a rotation barrel of the dehydrating device to rotate the rotation barrel. A driving gear is rotatably mounted on the base and meshing with the driven gear to rotate the driven gear. The drive mechanism also includes a spinning shaft having a lower end secured on the driving gear to rotate the driving gear. The driving mechanism further includes a drive member movably mounted on the spinning shaft. The drive member has an inner portion provided with a spinning shaft hole meshing with the spinning shaft to rotate the spinning shaft by axially moving the drive member relative to the spinning shaft. An elastic member is mounted on the spinning shaft and is biased between the drive member and a bottom of the housing to move the drive member downward axially relative to the spinning shaft. A pedal is pivotally mounted on the base and connected with the drive member to move the drive member upward axially relative to the spinning shaft and to compress the elastic member.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
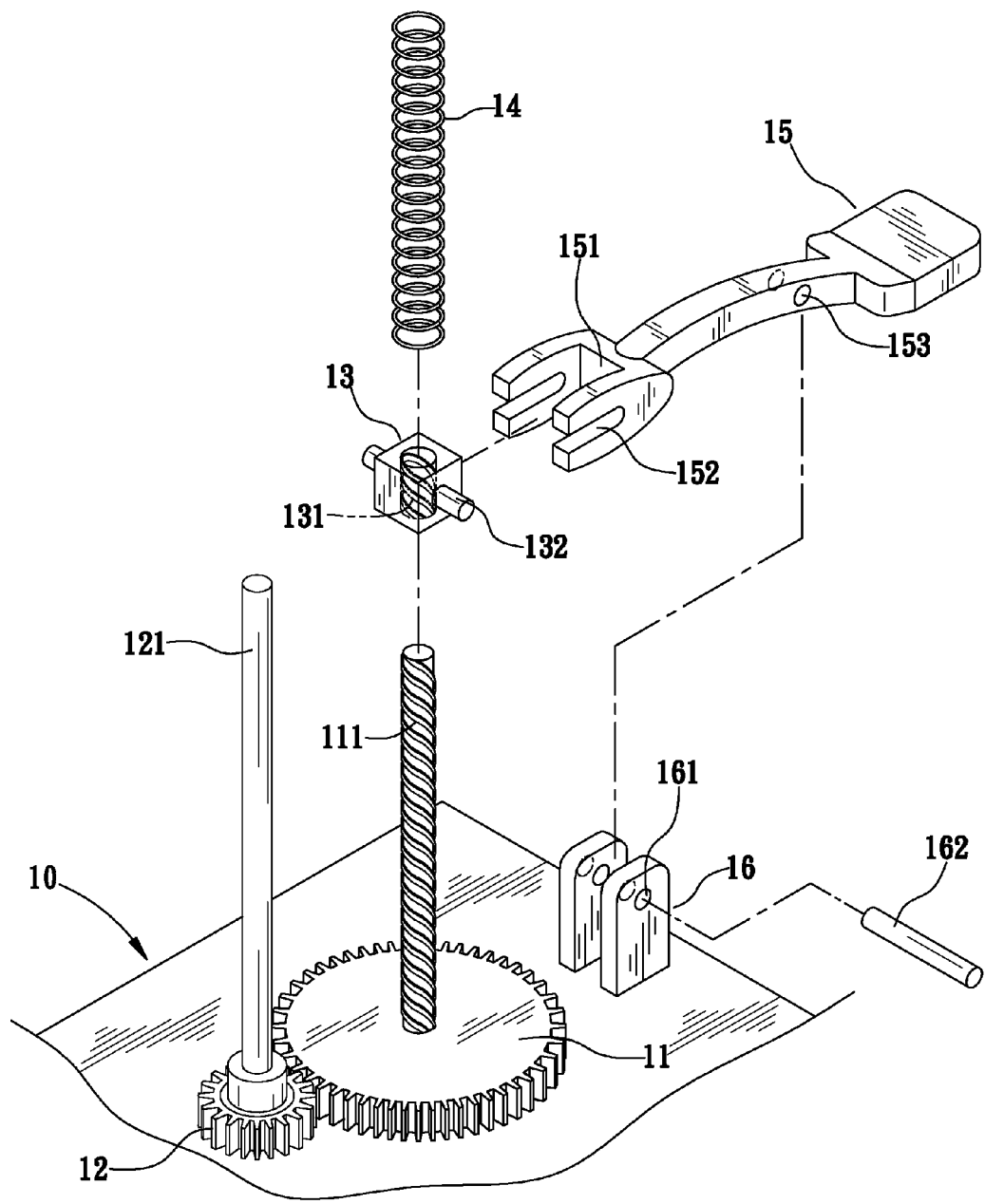
FIG. 1 is a perspective view according to an embodiment of the invention.
Figure 2:
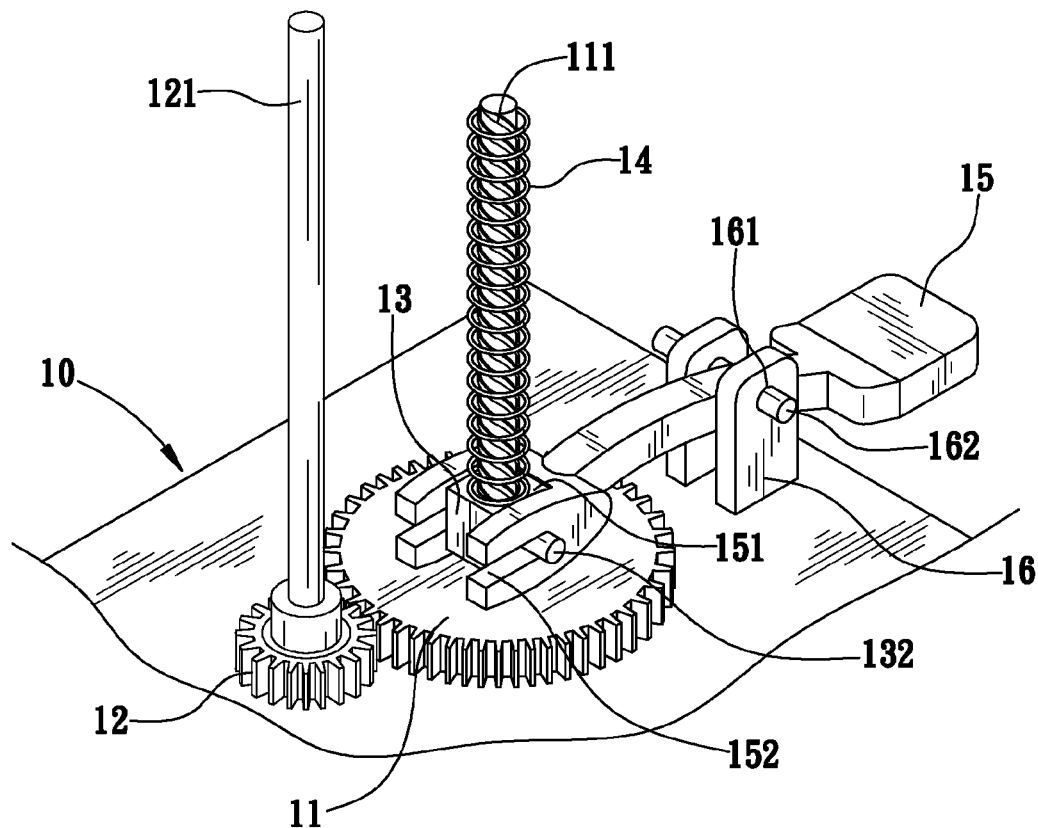
FIG. 2 is an exploded perspective view of FIG. 1 according to an embodiment of the invention.

Referring to FIGS. 1-4, one embodiment of a drive mechanism for a dehydrating device of the present invention includes a base 10, a second or driven gear 12 rotatably mounted on the base 10, a propeller shaft 121 having a lower end secured on and rotated by the driven gear 12 and an upper end extending through a housing 20 of the dehydrating device and secured to a rotation barrel 21 of the dehydrating device to rotate the rotation barrel 21, a first or driving gear 11 rotatably mounted on the base 10 and meshing with the driven gear 12 to rotate the driven gear 12, a spinning shaft 111 having a lower end secured on the driving gear 11 to rotate the driving gear 11, a drive member 13 movably mounted on the spinning shaft 111 and having an inner portion provided with a spinning shaft hole 131 meshing with the spinning shaft 111 to rotate the spinning shaft 111 by axially moving the drive member 13 relative to the spinning shaft 111, an elastic member 14 mounted on the spinning shaft 111 and biased between the drive member 13 and a bottom of the housing 20 to move the drive member 13 downward relative to the spinning shaft 111, and a pedal 15 pivotally mounted on the base 10 and connected with the drive member 13 to move the drive member 13 upward relative to the spinning shaft 111 and to compress the elastic member 14. In one embodiment, the elastic member 14 may be a spring.

In one embodiment, the housing 20 is located above the propeller shaft 121 and the spinning shaft 111. The rotation barrel 21 is rotatably mounted in the housing 20 to receive an article, such as a mop head (not shown). The spinning shaft 111 has an upper end abutting the bottom of the housing 20. The driving gear 11 has a diameter greater than that of the driven gear 12. The propeller shaft 121 is co-axial with the driven gear 12, and the spinning shaft 111 is co-axial with the driving gear 11.

In one example, the drive member 13 has two opposite sides each provided with a protruding pivot rod 132. The pedal 15 has an end portion provided with a pivot portion 151 pivotally connected with the drive member 13 to move the drive member 13 relative to the spinning shaft 111. The pivot portion 151 has a substantially U-shaped profile and has an opening to receive the drive member 13. The pivot portion 151 has two opposite sides each provided with an elongate pivot slot 152 pivotally mounted on the pivot rod 132.

In another embodiment, the drive mechanism further includes a pivot seat 16 mounted on the base 10, and the pedal 15 is pivotally mounted on the pivot seat 16 by a pivot pin 162. The pivot seat 16 consists of two upright support plates spaced from each other. The pivot seat 16 has two opposite sides each provided with a hole 161 to allow passage of the pivot pin 162. The pedal 15 is sandwiched between the two support plates of the pivot seat 16 and has a intermediate portion provided with a pivot hole 153 pivotally mounted on the pivot pin 162.

Figure 3:
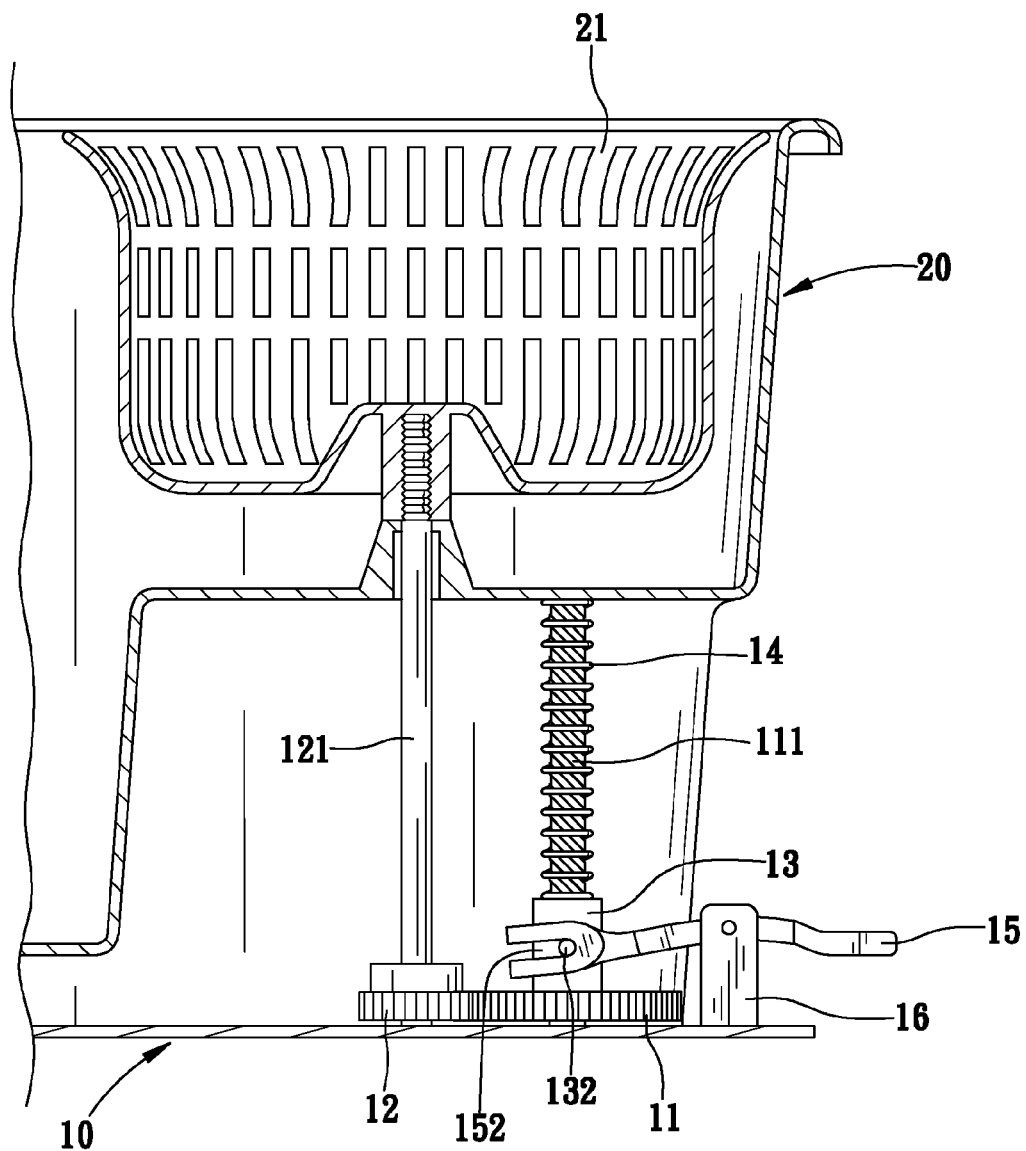
FIG. 3 is a front cross-sectional view of FIG. 1 according to an embodiment of the invention.
Figure 4:
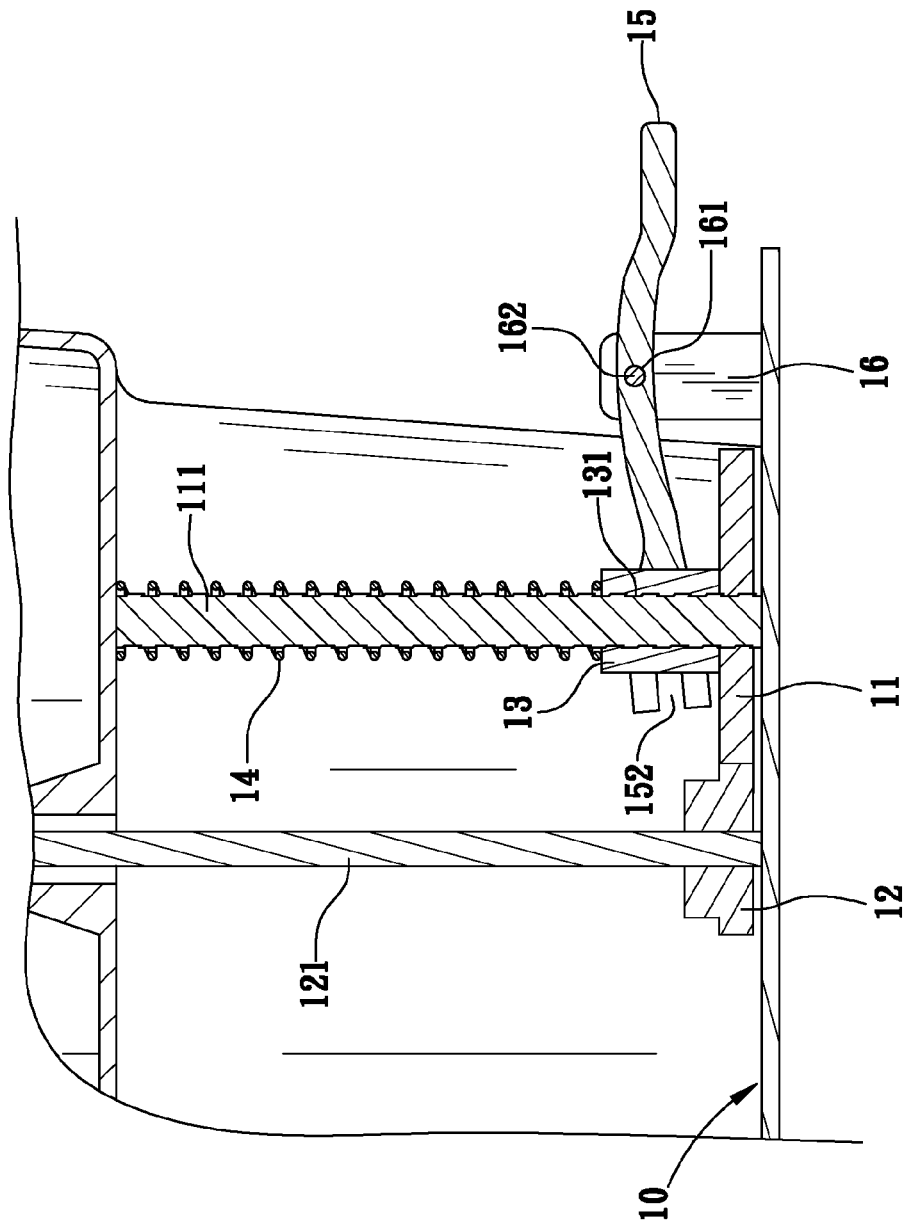
FIG. 4 is a locally enlarged view of FIG. 3 according to an embodiment of the invention.
Figure 5:
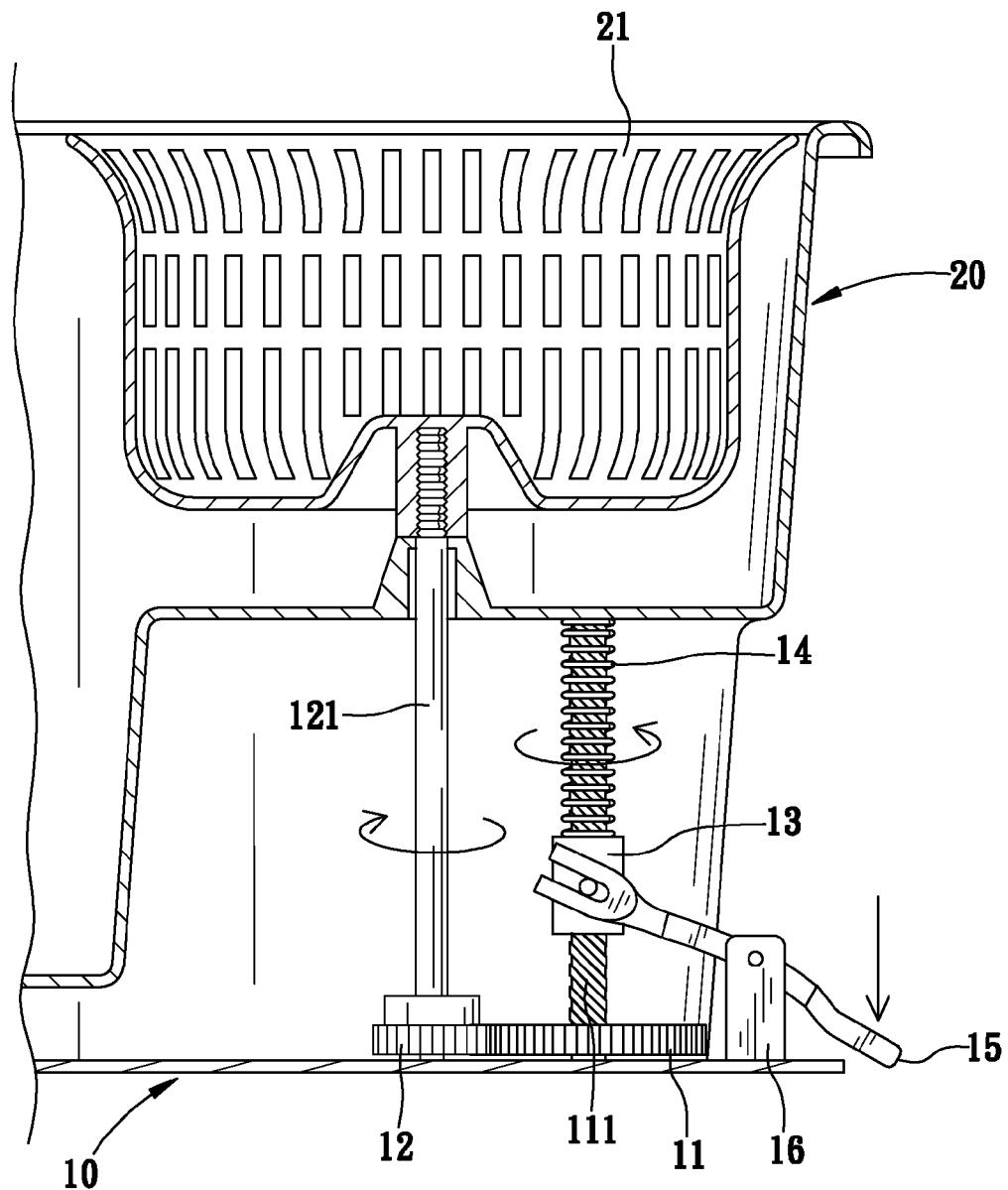
FIG. 5 is a schematic operational view of FIG. 3 according to an embodiment of the invention.
Figure 6:
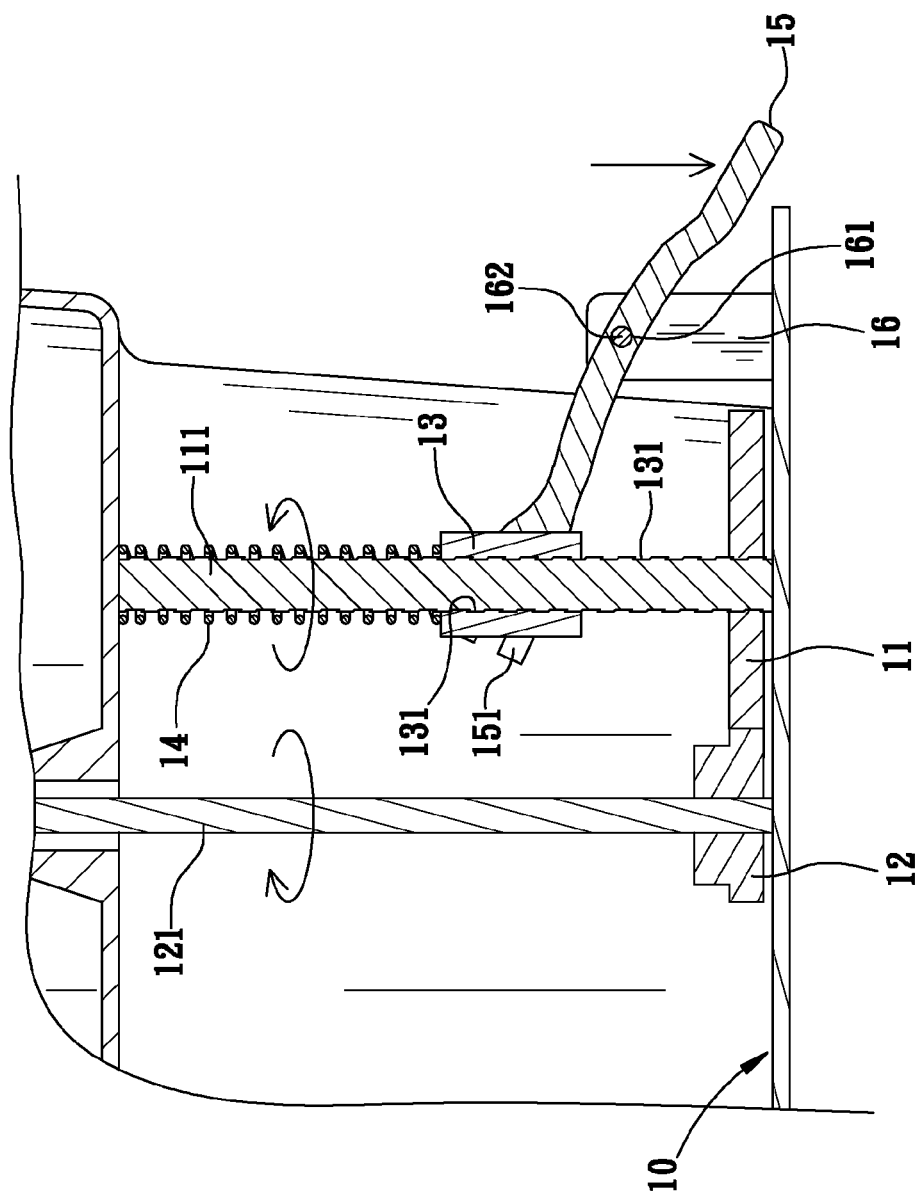
FIG. 6 is a schematic operational view of FIG. 4 in use according to an embodiment of the invention.

In operation, referring to FIGS. 1-6, supposed a user wishes dehydrate or ring out excess liquid from an article, such as a mop with a mop head. In one example, the mop head may be made of liquid absorbent material, such as cloth, to absorb liquid. As the excess liquid may be removed, the user will first insert or place the mop head in the rotating barrel 21. In order to activate or operate the drive mechanism according to one embodiment of the invention, the pedal 15 is stepped upon or depressed by the user. The pedal moves downward as shown in FIGS. 5 and 6, the pivot portion 151 moves upward to move the drive member 13 upward relative to the spinning shaft 111 and to compress the elastic member 14. At this time, the spinning shaft hole 131 meshes with the spinning shaft 111 so that when the drive member 13 moves upward relative to the spinning shaft 111, the spinning shaft 111 is driven and rotated about the spinning shaft hole 131 to rotate the driving gear 11 which next rotates the driven gear 12 which rotates the propeller shaft 121. The propeller shaft 121 drives the rotation barrel 21 to rotate in the housing 20.

When the stepping force applied on the pedal 15 is removed, such as the user steps away from the pedal 15, the drive member 13 is driven by the restoring force of the elastic member 14 to move downward relative to the spinning shaft 111 as shown in FIGS. 3 and 4. At this time, the spinning shaft hole 131 meshes with the spinning shaft 111 so that when the drive member 13 is moved downward relative to the spinning shaft 111, the spinning shaft 111 is driven by the spinning shaft hole 131 to rotate in the opposite direction and to rotate the driving gear 11 which rotates the driven gear 12 which rotates the propeller shaft 121 which drives the rotation barrel 21 to rotate in the housing 20 in the opposite direction. The above-mentioned procedures are repeated successively so that the rotation barrel 21 is rotated reciprocally to spin the mop head forward and backward so as to dry the mop head.

As such, instead of complicated construction of the dehydrating device as described in the prior art, aspects of the invention provide a simple yet effective and efficient mechanism to accomplish the dehydrating task.

Obviously numerous modifications and variations of the present invention are possible in light of the above teachings. It is therefore understood that within the scope of the appended claims, the invention may be practiced otherwise than as specifically described herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

What is claimed is:

1. A drive mechanism for a dehydrating device, comprising:

a base;
a driven gear rotatably mounted on the base;
a propeller shaft having a lower end secured on and rotated by the driven gear and an upper end extending through a housing of the dehydrating device and secured to a rotation barrel of the dehydrating device to rotate the rotation barrel;
a driving gear rotatably mounted on the base and meshing with the driven gear to rotate the driven gear;
a spinning screw shaft having a lower end secured on the driving gear to rotate the driving gear;
a drive member movably mounted on the spinning screw shaft, said drive member comprising a nut having an inner portion for receiving the spinning screw shaft to rotate the spinning screw shaft by axially moving the drive member relative to the spinning screw shaft
an elastic member mounted on the spinning screw shaft and biased between the drive member and a bottom of the housing to move the drive member downward relative to the spinning screw shaft; and
a pedal pivotally mounted on the base and connected with the drive member to move the drive member upward relative to the spinning screw shaft and to compress the elastic member.

2. The drive mechanism for a dehydrating device of claim 1, wherein the driving gear has a diameter greater than that of the driven gear.

3. The drive mechanism for a dehydrating device of claim 1, wherein the propeller shaft is co-axial with the driven gear; and the spinning screw shaft is co-axial with the driving gear.

4. The drive mechanism for a dehydrating device of claim 1, wherein the pedal includes an end portion provided with a pivot portion pivotally connected with the drive member to move the drive member relative to the spinning screw shaft.

5. The drive mechanism for a dehydrating device of claim 4, wherein the pivot portion includes a substantially U-shaped profile.

6. The drive mechanism for a dehydrating device of claim 5, wherein the drive member includes two opposite sides each provided with a protruding pivot rod; and the pivot portion includes two opposite sides each provided with an elongate pivot slot pivotally mounted on the pivot rod.

7. The drive mechanism for a dehydrating device of claim 1, further comprising a pivot seat mounted on the base, wherein the pedal is pivotally mounted on the pivot seat by a pivot pin.

8. The drive mechanism for a dehydrating device of claim 7, wherein the pivot seat includes two opposite sides each provided with a hole to allow passage of the pivot pin.

9. The drive mechanism for a dehydrating device of claim 7, wherein the pedal includes a intermediate portion provided with a pivot hole pivotally mounted on the pivot pin.

* * * * *